United States Patent [19]
Nixon et al.

[11] Patent Number: 5,475,743
[45] Date of Patent: * Dec. 12, 1995

[54] SYSTEM AND METHOD FOR PROCESSING TELEPHONE NUMBERS

[75] Inventors: Toby L. Nixon, Kirkland; Arul A. Menezes, Bellevue, both of Wash.

[73] Assignee: Microsoft Corporation, Redmond, Wash.

[ * ] Notice: The portion of the term of this patent subsequent to Sep. 19, 2012, has been disclaimed.

[21] Appl. No.: 148,057

[22] Filed: Nov. 5, 1993

Related U.S. Application Data

[63] Continuation of Ser. No. 170,999, Jun. 24, 1993.

[51] Int. Cl.$^6$ .................................................. H04M 3/38
[52] U.S. Cl. ........................ 379/113; 379/355; 379/354; 379/245; 379/207
[58] Field of Search ............................ 379/355, 211, 379/127, 207, 67, 60, 245, 112, 113, 201, 354, 359

[56] References Cited

U.S. PATENT DOCUMENTS

| | | | |
|---|---|---|---|
| 4,769,834 | 9/1988 | Billinger et al. | 379/245 |
| 4,791,665 | 12/1988 | Bogart et al. | 379/207 |

FOREIGN PATENT DOCUMENTS

| | | | |
|---|---|---|---|
| 0526832 | 2/1993 | European Pat. Off. | H04M 1/274 |
| 0530010 | 3/1993 | European Pat. Off. | H04M 1/274 |

OTHER PUBLICATIONS

*Patent Abstracts of Japan*, unexamined applications, E field, vol. 15, No. 419, Oct. 24, 1991, p. 167 E 1126; JP–A–03 175 797 (NEC) Abstract.

*Primary Examiner*—Jeffery A. Hofsass
*Assistant Examiner*—Jacques M. Saint-Surin
*Attorney, Agent, or Firm*—Seed and Berry

[57] ABSTRACT

A system and method using canonical telephone numbers which allows automatic calling with any location in the world independent of the caller's location. The caller canonical telephone number and a plurality of caller prefixes are stored within the system. A telephone directory stores a plurality of callee canonical telephone numbers for locations throughout the world. The caller manually enters a callee telephone number or selects a callee telephone number from the telephone directory. The system determines if the callee telephone number is a canonical telephone number. The system expands non-canonical telephone numbers to canonical form using known telephone numbering rules for various countries. The system uses the callee canonical telephone number and the caller canonical telephone number to determine which digits of the callee canonical telephone number must be placed on the telephone line to complete the call. The system then adds the appropriate prefix for international, long distance, or local telephone calls to generate a final callee telephone number.

64 Claims, 8 Drawing Sheets

SYSTEM AND METHOD FOR PROCESSING TELEPHONE NUMBERS

CROSS-REFERENCE TO RELATED APPLICATION

This application is a continuation-in-part of U.S. patent application Ser. No. 08/170,999 filed Jun. 24, 1993.

TECHNICAL FIELD

The invention relates generally to a system and method for telephonic communications, and more specifically to a system and method for uniquely defining and dialing non-canonical telephone numbers.

BACKGROUND OF THE INVENTION

Telephonic communications has become an accepted part of modern society. Even in the most remote portions of the earth, telephone service is available through a worldwide telephone communications network. Other communication devices, such as facsimile machines, can also use the worldwide telephone communications network to send a facsimile message from one remote corner of the earth to another, or from one office to another in the same building, simply by dialing the appropriate facsimile telephone number. The worldwide telephone communications network couples these devices to each other.

Obviously, to properly complete a telephone connection a caller must know the complete telephone number of the location to which the telephone call is placed. A drawback of the current worldwide telephone communications network is that the caller must also be aware of the location from which the call is being placed (i.e., the caller telephone number). Thus, the number and sequence of digits of the callee telephone number is dependent on the location of both the caller and the callee.

For example, in some locations the caller may have to dial a local prefix, such as a "9," to connect to an outside line while other locations do not require that a 9 be dialed to connect to an outside line. The caller may be required to dial an area code to properly complete a telephone call to one location within the United States but not to another more proximate location. These location-dependent requirements often cause confusion in placing telephone calls and the dialing of telephone numbers incorrectly.

In some situations, the caller may have only a partial callee telephone number rather than a complete callee telephone number including international prefixes, country code, long distance code, and the like. For example, a caller may only have the callee subscriber telephone number 555-1234. It may be necessary to add digits to the telephone number to properly complete the telephone call.

Therefore, it can be appreciated that there is a significant need for a system and method for uniquely identifying the callee telephone and placing telephone calls in a manner that automatically takes caller location into account.

SUMMARY OF THE INVENTION

The invention is embodied in a system coupled to a telephone exchange and containing a station information storage area for storing a station canonical telephone number for a first location coupled to the telephone exchange. Data entry means permit the entry of a non-canonical telephone number for a location other than the first location and an expansion analyzer analyzes the non-canonical telephone number to determine if the non-canonical telephone number contains a first portion corresponding to a first portion of the station canonical telephone number. If the non-canonical telephone number does not contain a first portion corresponding to the first portion of the station canonical telephone number, the expansion analyzer expands the non-canonical telephone number by adding the first portion of the station canonical telephone number to the non-canonical telephone number such that the expanded non-canonical telephone number contains the first portion of the station canonical telephone number.

The expansion analyzer may further analyze the non-canonical telephone number to determine if the non-canonical telephone number contains a second portion corresponding to a second portion of the station canonical telephone number. If the non-canonical telephone number does not contain a second portion corresponding to the second portion of the station canonical telephone number, the expansion analyzer further expands the non-canonical telephone number by adding the second portion of the station canonical telephone number to the non-canonical telephone number.

The station information storage area may contain a preferred interchange carrier telephone number for a designated long distance carrier. The system includes adder means for adding the preferred interchange carrier telephone number to the expanded non-canonical telephone number to permit telephonic communication to the expanded non-canonical telephone number using the designated long distance carrier. The system may also include a user code used for billing purposes, with the expansion analyzer adding the user code to the expanded non-canonical telephone number. The first and second portions of the station canonical telephone number comprise a country code and a long distance code. The system also includes a dialer generating dialing signals on the telephone exchange to initiate telephonic communication to the expanded non-canonical telephone number. In one embodiment, the dialer includes a speaker to acoustically couple the system to the telephone exchange and to transmit dialing signals to the telephone exchange.

In an alternative embodiment, the system includes a station alteration means for altering the station canonical telephone number and for storing the altered station canonical telephone number in the station information storage area. The expansion analyzer uses the altered station canonical telephone number to analyze the non-canonical telephone number.

The data entry means may include a keypad to permit the manual entry of the non-canonical telephone number by a user. Alternatively, the data entry means may include a touch-sensitive display to permit manual entry of the non-canonical telephone number by a user.

The system may further include a telephone book storage area storing a plurality of non-canonical telephone numbers for locations other than the first location. Selection means are provided for selecting one of the plurality of the stored non-canonical telephone numbers from the phone book storage area as the non-canonical telephone number to be analyzed.

The system may further include canonical processing means for processing the expanded non-canonical telephone number by comparing the first portion of the station canonical telephone number to the corresponding first portion of the expanded non-canonical telephone number and deleting the first portion of the expanded non-canonical telephone number if it matches the first portion of the station canonical telephone number.

The system may also include correction means to permit the user to generate a corrected callee telephone number if the first portion of the expanded non-canonical telephone number was deleted by the canonical processing means. The correction means restores the first portion of the expanded non-canonical telephone number to generate the corrected callee telephone number. The system may also include memory means for generating the corrected callee telephone number in future telephonic communications to the non-canonical telephone number.

DETAILED DESCRIPTION OF THE INVENTION

Figure 1:
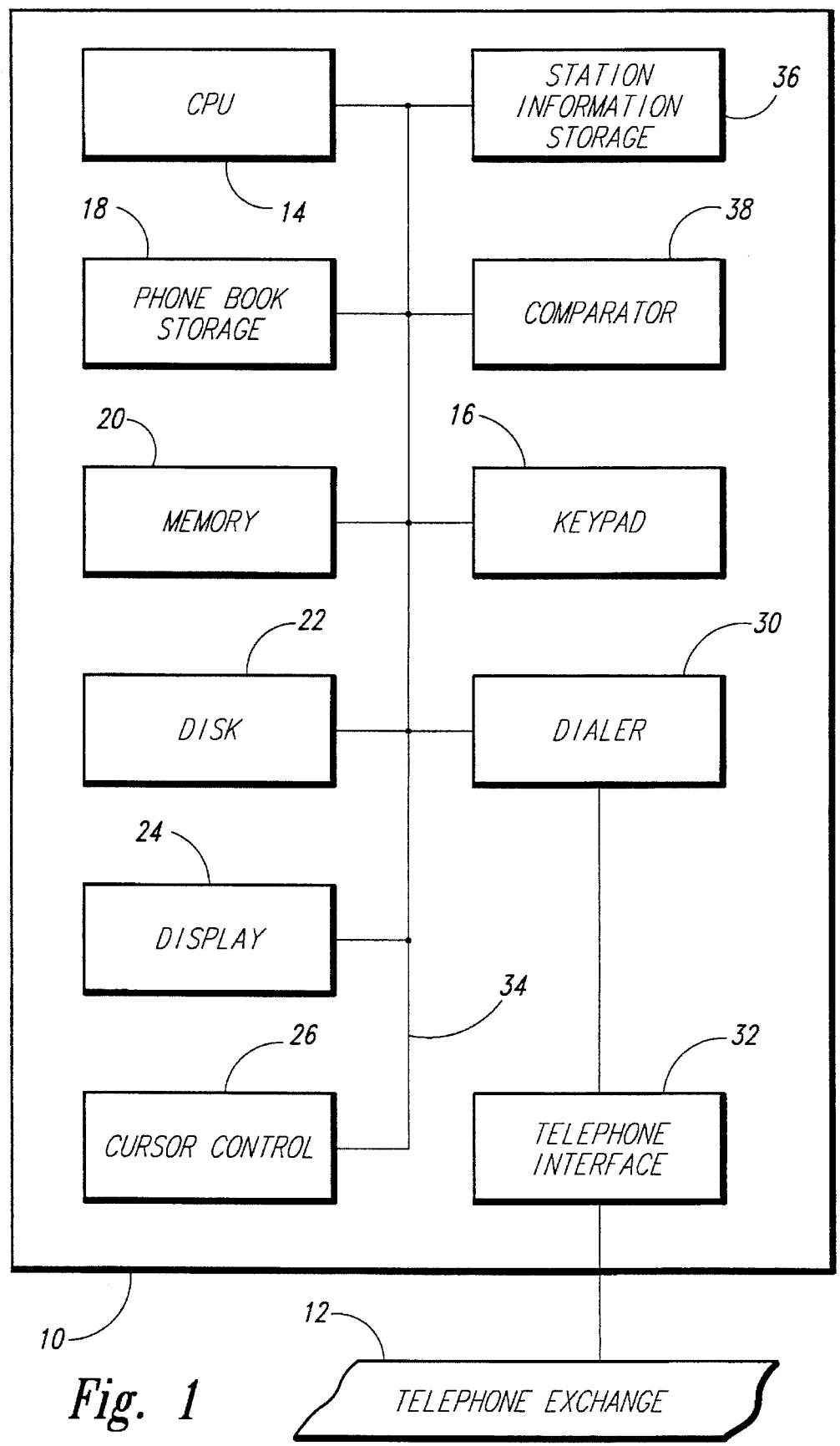
FIG. 1 is a functional block diagram of the inventive system.

A telephone number and physical location of the corresponding telephone are uniquely identified at the time the telephone is installed by the telephone company. Even a portable telephone has a unique telephone number associated with it to identify the specific device. The subscriber telephone number comprises an exchange prefix and an individual telephone number. For example, the exchange number may be 555, and the individual telephone number 1234. If the telephone is installed in Seattle, Wash., the area code assigned to the Seattle metropolitan area is 206. Therefore, the telephone has the telephone number (206) 555-1234.

A person within the Seattle area may call the telephone in the above example by dialing the subscriber telephone number 555-1234, while a person calling this telephone from California must dial a "1", the area code, and the subscriber telephone number. The term "dialing" as used herein refers to the process of generating signals required to complete a telephone connection. This may include rotary dialing, pulse dialing, dual-tone multi-frequency (DTMF) dialing, the transmission of call setup commands on a digital telephone interface, such as Integrated Services Digital Network (ISDN), or the like, when done manually or by a machine. The present invention is not to be limited by the manner in which dialing occurs.

The caller usually knows only the area code and subscriber telephone number of his own telephone. The caller typically uses these numbers to provide others with his telephone number. However, there are other numbers that are associated with a particular telephone. Each country has an international code associated with it that must be dialed to indicate to the local telephone company that the call is intended for a particular other country. For example, a person calling the Seattle telephone in the example above from France must dial an international code to indicate to the local French telephone company that the call is an international telephone call to the United States. The United States has an international code of "1". Therefore, the caller in France must dial 1-206-555-1234 to reach the telephone in Seattle.

In addition, the caller may have to dial other numbers to indicate to the local telephone company that the call is a long distance call. For example a person calling the above Seattle telephone from California may have to dial a "9" to get an outside line. The user may then have to dial a "1" to indicate to the local California telephone company that the telephone call is a long distance call. Thus, the caller in California may have to dial 9-1-206-555-1234 to call the telephone in Seattle.

If the person calling from California is traveling outside California and wants to call the above Seattle telephone, the person must know information about an unfamiliar local telephone system as well as the information about the Seattle telephone he wishes to call. For example, the person may need to know not to dial a "9" to get an outside line from his new location. If the person is calling from within the Seattle area, he may not need to dial a "1" or the area code. As can be understood, the telephone numbers that are required for the proper connection to a telephone are location dependent and may vary from one location to another.

The inventive system per, nits location independent telephone communications in which the caller need not be concerned about the location specific information in order to complete a telephone call. The system uses canonical telephone numbers that have complete information about a particular telephone. The term "canonical telephone number," as used herein, describes a complete telephone number that uniquely identifies a telephone location anywhere in the world. This includes an international country code, an area code, and a subscriber telephone number. The term "area code" may alternatively be referred to as a long distance code, a city code, or a routing code in different countries. The present invention is not limited by the local terminology used to describe portions of the canonical telephone number. The inventive system stores the canonical telephone number for its own specific location as well, and uses only the portions of the callee canonical telephone number that are required to complete the telephone connection from the caller location to the callee location. The term "location," as used herein, refers to a specific telephone rather than a specific geographical position. As can readily be appreciated, a portable telephone can be moved from one geographical position to another. However, the telephone number assigned to that location, or telephone, remains unchanged. The inventive system can recognize and process non-canonical telephone numbers as well as canonical telephone numbers and is thus compatible with a normal dialing procedure in which the user enters only the required portions of the callee telephone number. The processing of non-canonical telephone numbers will be described below.

The invention is embodied in a system 10, shown in the functional block diagram of FIG. 1. The system 10 is coupled to a telephone exchange 12 by any number of well known connectors such as a modular plug (not shown). The system 10 may also be remotely coupled to the telephone exchange 12, as is the case with portable or cellular telephones. As used herein, the telephone exchange 12 includes any network capable of routing calls, such as a local exchange carrier (LEC), an interchange carrier (IXC), a private branch exchange (PBX), a Centrex facility, or any public or private telephone network. The present invention is not to be limited by the type of telephone exchange 12 to which the system 10 is coupled.

The system 10 contains a central processing unit (CPU) 14 and a keypad 16, which may be of the type commonly used in conventional telephone systems. Additional keys may also be provided on the keypad 16, as will be described below. The keypad 16 is used by the caller to manually enter the required portions of callee telephone number if the caller is not using the canonical telephone number or if the caller is initially storing a callee telephone number for subsequent use in accordance with the present invention. Alteratively, a plurality of callee telephone numbers may be stored in a phone book storage area 18. The phone book storage area 18 may be within a memory 20 of the system 10, such as random access memory. Alternatively, the phone book storage area 18 may be stored in a nonvolatile storage device such as a disk or diskette drive 22.

A display 24, such as a video display, allows the user to view the stored canonical telephone numbers. A cursor control device 26 such as a mouse or trackball permits the user to select a particular stored canonical telephone number from the phone book storage area 18 and to enter commands related to telephone communications. Alternatively, the additional keys on the keypad 16, such as arrow keys, may be used to select a particular stored canonical telephone number from the phone book storage area 18 and enter commands related to telephone communications. If the system 10 is incorporated into a computer, such as a personal computer (PC), the CPU 14, keypad 16, phone book storage area 18, memory 20, disk 22, display 24, and cursor control device 26 may be part of the PC.

The system 10 includes an expansion circuit 28 to expand non-canonical telephone numbers into canonical form. The expression analyzer is used whenever the user enters a non-canonical telephone number using the keypad 16, or selects a telephone number from the phone book storage area 18 that is in non-canonical form. The operation of the expansion circuit 28 will be discussed in detail below.

A dialer 30 generates the dialing signals on the telephone exchange 12 through a telephone interface 32. The dialer 30 and the telephone interface 32 are well known and will not be discussed herein. The portions of the system 10 are coupled to each other by a data bus 34, which may carry electrical power as well as data signals. The system 10 may also include a telephone handset (not shown) for voice communication or a modem (not shown) for electronic communication such as email or facsimile.

The canonical telephone number for a caller telephone is specific to the caller location and is stored within the system 10 in a station information storage area 36, which may be part of the memory 20 or disk 22. The caller telephone canonical telephone number is determined only one time, usually at the time of installation of the system 10. For example, if the system 10 is incorporated into a facsimile machine being installed in Seattle, Washington, the caller telephone canonical telephone number for the particular location will include the international code for the United States, the area code for the Seattle metropolitan area, and the subscriber telephone number. In the example above, the caller telephone canonical telephone number is 1-206-555-1234. The caller telephone canonical telephone number is assigned to the specific telephone and will not change unless the telephone is moved to a different location or if the telephone company changes the telephone number. In the example above, if the system 10 is moved from its Seattle location to a new location in Seattle, the system may have a new subscriber telephone number that will be stored in the station information storage area 36. If the station is moved from its Seattle location to California, the area code will have to be changed as well. Thus, it is readily seen that the caller telephone canonical telephone number assigned to a specific system 10 is unique to that location and must be changed if the system is moved to a new location. However, the caller station canonical telephone number for the system 10 need only be defined for the system at the time of installation and stored in the station information storage area 36. The user need not enter, or even have knowledge of, the caller telephone canonical telephone number.

In addition to the caller telephone canonical telephone number, each telephone station has prefixes that are required for the proper connection with the telephone exchange 12. A caller telephone prefix is a number that must be dialed before the callee telephone number to indicate the type of telephone call to the local telephone company. For example, a long distance call within the United States generally requires a long distance prefix "1" to be dialed before the area code and subscriber telephone number. The system 10 stores a set of prefixes for local telephone calls, long distance telephone calls, and international telephone calls, respectively, for the particular caller telephone. The system 10 compares the caller and callee canonical telephone numbers to determine which portions of the callee canonical telephone number are required for proper connection, and then attaches the appropriate prefix so that the dialer 30 dials the appropriate prefix and portions of the callee telephone number determined by the system. The station information storage area 36 for each caller telephone stores an international prefix and a long distance prefix, and may have a local prefix as well. For example, if the caller must first dial a "9" to connect to an outside line, the local prefix for the caller station would be a "9". If the caller does not have to dial a "9" (or some other number), the local prefix is empty. Similarly, the long distance prefix is "91" (if the caller must first dial a "9" to connect to an outside line) or simply be a "1" (if the caller does not have to dial a "9"). The international prefix for the United States is "9011" (if the caller must first dial a "9" to connect to an outside line) or simply be a "011" (if the caller does not have to dial a "9"). The prefixes may also include other codes such as an access code for a long distance company, or the like. The set of telephone prefixes are defined for the system 10 only one time and are stored in the station information storage area 36. The prefixes need only be changed if the telephone is moved to a new location where the prefixes are different, such as from a line requiring a 9 to one not requiring it or vice versa. Thus, it is readily seen that the user need not enter the appropriate prefix; rather, the system 10 determines the appropriate prefix and adds it to callee telephone number.

The user may enter a callee canonical telephone number into the phone book storage area 18 using the keypad 16. Alternatively, the user may install a list of callee canonical telephone numbers into the phone book storage area 18 using the disk 22. This is particularly useful when transferring a list of callee canonical telephone numbers from one system 10 to another system of the same design. Because the callee canonical telephone numbers are location independent, a list of callee canonical telephone numbers can be easily transferred from system 10 to another without requiring any alteration of the list. For example, a large multinational corporation may have offices worldwide. Using the principles of the present invention, the corporation can create a single callee canonical telephone list for the entire corporation and store the list on a disk. Copies of the disk can be sent to all offices regardless of their locations and installed on the system 10 in each office. In this manner, each office can be supplied with a telephone list for the entire corporation with a minimum of labor. No translation of the phone list is required for specific locations. This feature also simplifies the task of updating the telephone list as it changes since the same list can be used in any location throughout the world.

The callee canonical telephone numbers stored in the phone book storage area 18 can be selected by the user by a number of well known means. For example, the system 10 can use a menu in which the stored canonical telephone numbers are displayed for the user. The user may select a particular callee canonical telephone number using the cursor control device 26 to position a cursor on the display 24 at the display location of the selected callee canonical telephone number. Alternatively, if the display 24 is a touch-sensitive display, the user may select the selected callee canonical telephone number by touching the touch-sensitive display at a position corresponding to the displayed location of the selected callee canonical telephone number. It is to be understood that the manner in which callee canonical telephone numbers are selected should not be considered a limitation of the present invention. The user may edit one or more entries in the phone book storage area using the keypad 16.

Once the callee canonical telephone number has been selected by the caller, the system 10 compares the callee canonical telephone number with the caller canonical telephone number stored in the station information storage area 36. A comparator 38 compares portions of the caller telephone canonical telephone number with corresponding portions of the selected callee canonical telephone number and generates a match signal if the portions match. The system 10 only uses the portions of the callee canonical telephone number that are required to make a proper connection. After the required portions of the callee telephone number have been determined, the system 10 adds the appropriate caller telephone prefix to the callee telephone number to generate a final callee telephone number. The final callee telephone number includes the appropriate prefix and required portions of the callee canonical telephone number. The dialer 30 dials the final callee telephone number to place a telephone call to the callee telephone.

Figure 2A:
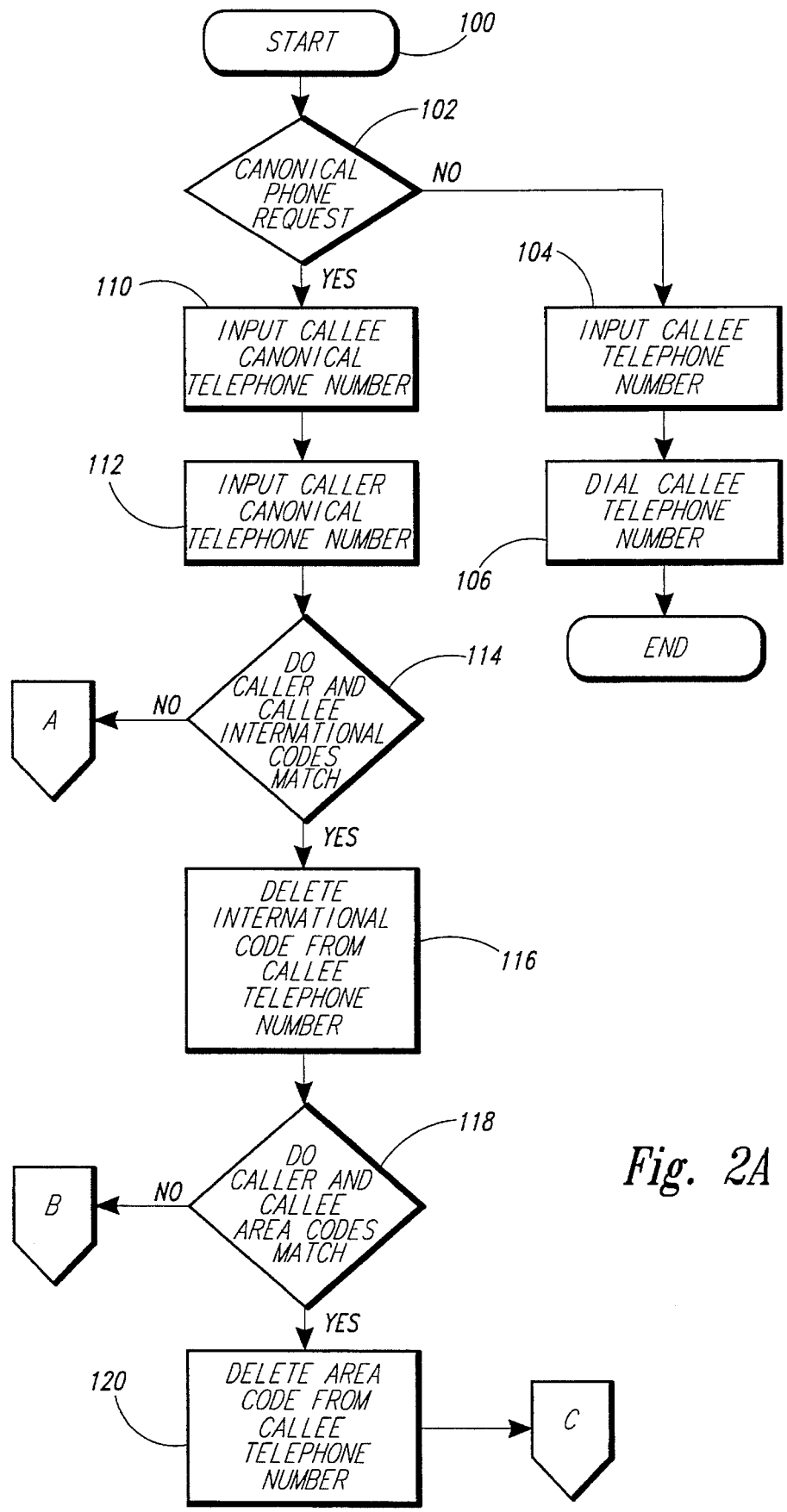
FIG. 2A is a flow chart illustrating the operation of the system of FIG. 1.
Figure 2B:
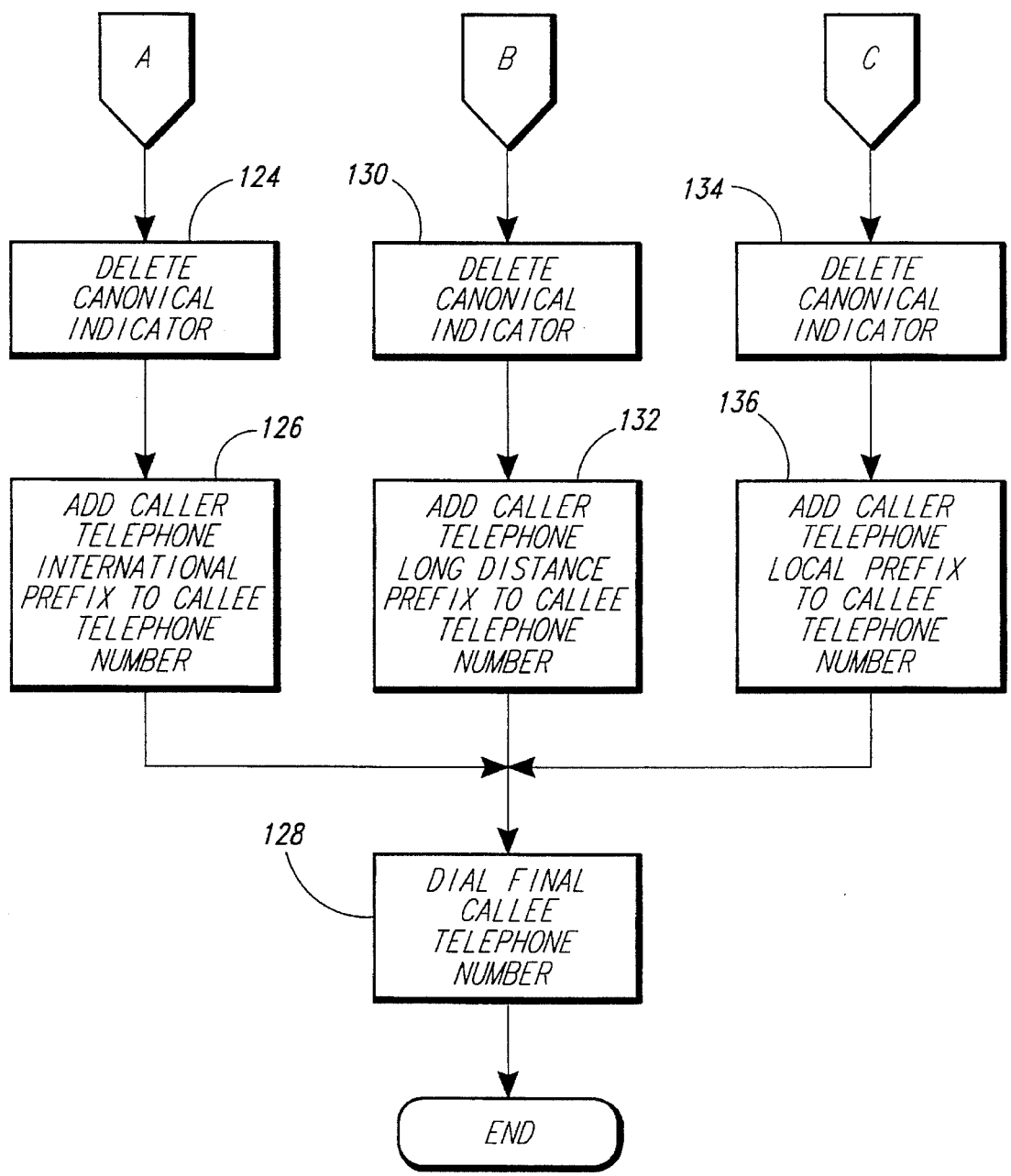
FIG. 2B is a continuation of the flow chart of FIG. 2A.

The method used to determine the final callee canonical telephone number is shown in the flow charts of FIGS. 2A–2B. In FIG. 2A, the system 10 struts at 100. The system 10 determines whether the user is entering a canonical callee telephone number or a non-canonical callee telephone number. The system 10 uses a canonical indicator to identify a canonical telephone number. In the presently preferred embodiment, a callee telephone number is a canonical telephone number when the first character is a "+" sign. Obviously, other selected characters or techniques could be used to identify a canonical telephone number. If the first character is not a "+" sign, the callee telephone number is not a canonical telephone number and the result of decision 102 is NO. In that event, the system 10 accepts the callee non-canonical telephone number in step 104 and will attempt the expansion of the callee non-canonical telephone number. Expansion of non-canonical telephone numbers will be discussed in detail below.

If the first character is a "+" sign, it indicates that the callee telephone number is a canonical telephone number, and the result of decision 102 is YES. In that event, the system 10 accepts the callee canonical telephone number in step 110. Step 110 of inputting a callee canonical telephone number may be performed by selecting a callee canonical telephone number from the callee canonical telephone numbers stored in the phone book storage area 18, as previously described.

In step 112, the system 10 inputs the caller canonical telephone number from the station information storage area 36 (see FIG. 1). The system 10 compares the international codes of the caller canonical telephone number and the callee canonical telephone number in decision 114. If the two international codes match, the result of decision 114 is YES. In that case, the system 10 deletes the international code from the callee canonical telephone number in step 116. In decision 118, the system 10 compares the long distance codes (area codes) of the caller canonical telephone number and the callee canonical telephone number. If the two area codes match, the result of decision 118 is YES. In that case, the system 10 deletes the area code from the callee canonical telephone number in step 120. Note that in some locations it is necessary to dial the area code even though the caller and callee canonical telephone numbers have the same area code. For example, it is necessary to dial a "1" long distance prefix and the 206 area code to complete a telephone connection in some parts of the Seattle area. The system 10 (see FIG. 1) can be configured so as not to delete the area code if the caller and callee area codes match. Alternatively, the system 10 could be configured to compare the exchange portions of the caller and callee canonical telephone numbers to determine if the area code is required.

If the international codes of the caller canonical telephone number and the callee canonical telephone number do not match, the result of decision 114 is NO. This indicates that the callee telephone number is an international call and requires the complete callee canonical telephone number. The system 10 does not delete the international code from the callee canonical telephone number. Instead, the system 10 deletes the canonical indicator (i.e., the "+" sign) in step 124, shown in FIG. 2B. In step 126, the system 10 adds the required caller telephone prefix for international calls to the callee canonical telephone number to generate the final callee canonical telephone number. The system 10 then proceeds to dial the final canonical telephone number in step 128.

Similarly, if the callee and caller international codes did match, but the area codes did not match, the result of decision 118, shown in FIG. 2A, is NO and the system 10 does not delete the area code from the callee canonical telephone number. Note that the international code has been previously deleted from the callee canonical telephone number by step 116. The callee area code is not deleted, but the system 10 does delete the canonical indicator in step 130 of FIG. 2B. In step 132, the system 10 adds the required caller telephone prefix for long distance calls to the callee canonical telephone number to generate the final callee canonical telephone number. The system 10 then proceeds to dial the final canonical telephone number in step 128.

If the system 10 is used only within one country, the international code could be deleted from the canonical telephone number. In this case, the system 10 only compares the area codes.

If the callee and caller international codes and long distance codes both match, the result of decisions 114 and 118 in FIG. 2A are both YES. In that event, the system 10 need only dial the subscriber telephone number. Note that the international code and the area code have previously been deleted from the callee canonical telephone number in steps 116 and 120, respectively. Following step 120, in step 134, shown in FIG. 2B, the system 10 deletes the canonical indicator. In step 136, the system 10 adds the required caller telephone prefix, if any, for local calls to the callee canonical telephone number to generate the final callee canonical telephone number. As previously discussed, the caller telephone local prefix may be null in which case the system 10 adds nothing to the callee canonical telephone number in step 136. The system 10 then proceeds to dial the final canonical telephone number in step 128.

As an example of the process described above consider that a person in the Seattle area has a caller canonical telephone number of +1 206 555-1234, an international prefix of 9011, and that the caller wishes to call a callee in Paris, France having a callee canonical telephone number of + 33 1 5555 1357. The result of decision 114 in FIG. 2A is NO, and the system 10 will not delete any of the callee canonical telephone number. Rather, the system 10 will delete the canonical indicator in step 124, shown in FIG. 2B, and add the caller telephone prefix (9011) for international telephone calls in step 126. Therefore, the final callee telephone number dialed by the dialer 30 (see FIG. 1) in step 128 is 9011 33 1 5555 1357.

As an additional example, consider that the caller in Seattle wishes to call a callee in California having a callee canonical telephone number of +1 415 555-4321. The result of decision 114 in FIG. 2A is YES, and the system 10 deletes the international code in step 116. However, the result of decision 118 is NO, and the system 10 does not delete the area code. The system 10 deletes the canonical indicator in step 130 and adds the caller telephone long distance prefix in step 132. Thus, the final callee telephone number in this example is 91 415 555-4321, assuming the caller telephone long distance prefix is 91.

Thus, the final callee telephone number dialed by the system 10 in step 128 is only the portion of the callee canonical telephone number that is required for the proper connection from the caller location. The user may make telephone calls without having to be concerned about the local prefixes or the various codes required for the proper connection with the desired callee.

While the present invention does not shorten the prefixes and codes used from a particular location, it does simplify the process of placing telephone calls by automatically determining which portions of a callee canonical telephone number are required. The system 10 also automatically adds the appropriate prefix to generate the final callee telephone number.

In other situations, the caller may not have the callee canonical telephone stored in the phone book storage area 18 (see FIG. 1) or may not enter the callee canonical telephone number using the keypad 16. The system 10 can expand a non-canonical telephone number into a canonical telephone before applying the procedure described above in relation to FIGS. 2A and 2B to generate the final callee telephone number.

Figure 3:
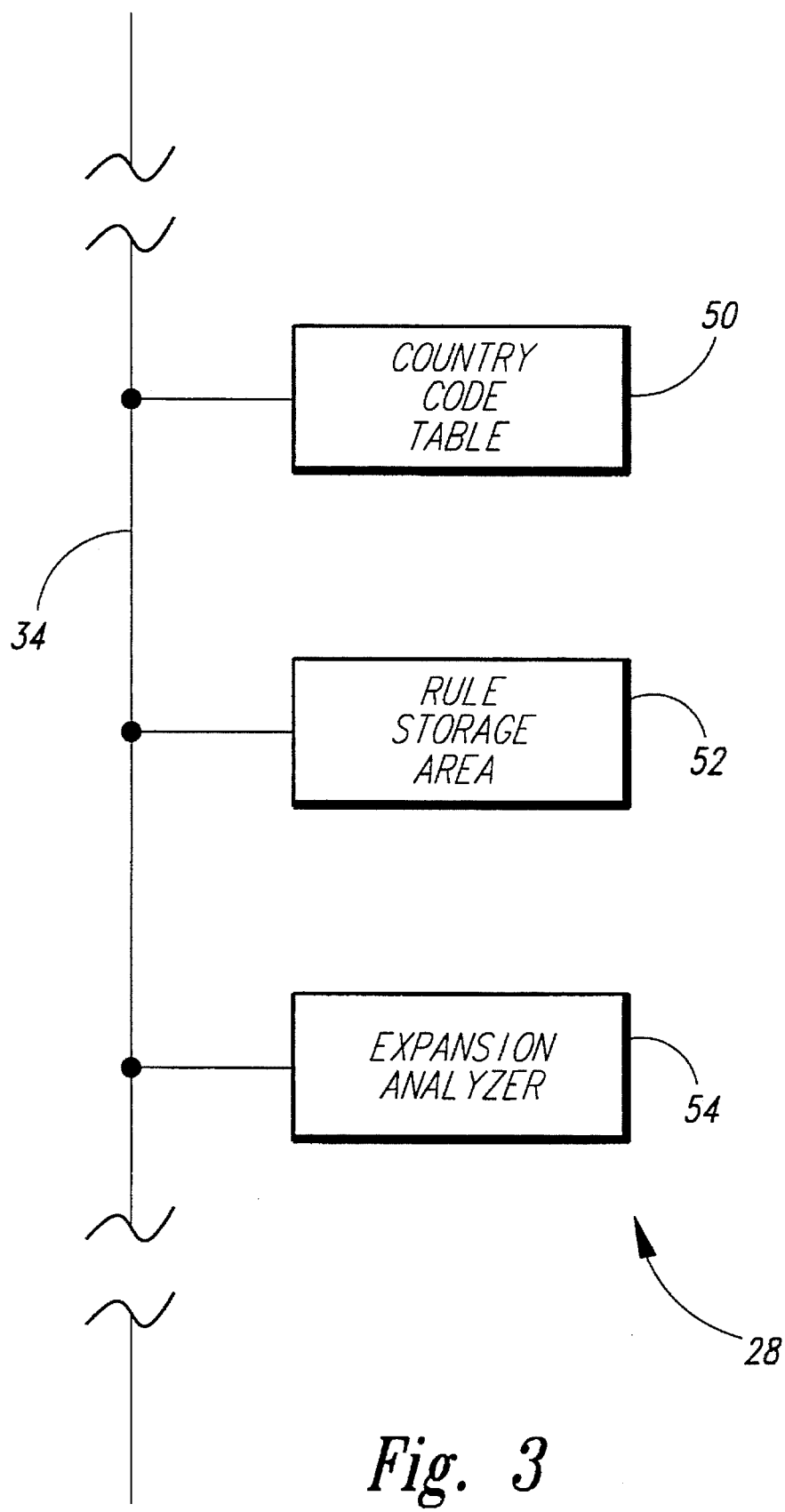
FIG. 3 is a functional block diagram of the expansion circuit of the system of FIG. 1.

The expansion circuit 28 is best seen in FIG. 3 where a country code table 50 stores country code data, which is determined by international agreement. The country code is used to identify the callee country when an international call is placed. For example, the country code for the United States is a "1." Most other countries have more than one digit in their respective country codes. A rule storage area 52 contains the telephone numbering rules for various countries. The country code table 50 and the rule storage area 52 are used by the system 10 to expand non-canonical telephone numbers into canonical form. An expansion analyzer 54 uses the data contained in the country code table 50 and the rule storage area 52 to process non-canonical telephone numbers into canonical form.

As previously stated, canonical telephone numbers stored in the phone book storage area 18 in canonical form each contain a "+" digit as the first stored digit. Thus, callee telephone numbers stored in the phone book storage area 18 in non-canonical form will not have a "+" digit as the first digit. This indicates to the system 10 that the non-canonical telephone number will have to be expanded to a canonical telephone number.

A callee non-canonical telephone number will generally consist of one of the following: (1) an extension number; (2) a subscriber number; (3) an area code and subscriber number; (4) a long distance prefix, an area code, and the subscriber number; (5) the country code and the subscriber number; (6) the country code, the area code, and the subscriber number; (7) an international prefix, the country code, and the subscriber number; or (8) the international prefix, the country code, the area code, and the subscriber number.

The expansion analyzer 54 applies known telephone numbering rules if a particular country is identified. The world has been divided into a number on calling plans with individual country codes and calling plan assignments being designated by international agreement. It should be noted that many countries may be contained within a calling plan. For example, the European Community (EC) is currently preparing a set of uniform telephone numbering rules. If there is a uniform set of telephone numbering rules, the system 10 need only store the rules for one of the countries within the particular calling plan. That country is designated by the system 10 as a primary country. Other countries using the uniform set of telephone numbering rules are designated as secondary countries. The country code table 50 contains pointers to the rule storage area for each particular country. The entry in the country code table 50 for secondary countries contains a pointer to the location in the rule storage area 52 for the primary country thus directing the expansion analyzer 54 to use the numbering rules in the rule storage area for the primary country. This approach eliminates the need for storage of redundant information and reduces the storage requirements of the rule storage area 52.

In other geographical areas, there may not be a uniform set of telephone numbering rules. In that case, the system 10 must store a separate set of telephone numbering rules for each country in the rule storage area 52. For example, the North American Numbering Plan includes more than twenty countries, but some countries within the North American Numbering Plan use their own telephone numbering rules. Therefore, it is necessary to maintain separate sets of telephone numbering rules for each country within the rule storage area 52. Alternatively, commonly used rules could be stored within the rule storage area 52 for only one country, thus reducing the overall storage requirements for the rule storage area. Telephone numbering rules that are unique to each country are stored in the rule storage area 52 for that country.

Because the callee non-canonical telephone number is incomplete, the expansion analyzer 54 must analyze the portions or segments of the callee non-canonical telephone number that are available to expand it into a complete callee canonical telephone number. The expansion analyzer 54 applies telephone numbering rules for a particular country if the country code is identified as one of the segments of the callee non-canonical telephone number. For example, the expansion analyzer 54 will apply the rules of the North American Numbering Plan if the callee non-canonical telephone contains a segment indicating that the callee telephone is located within the North American Numbering Plan. In some situations, the callee non-canonical telephone number does not contain any segment indicating the country.

Missing segments of the non-canonical telephone number are assumed to be the same as the corresponding segments of the caller canonical telephone number. In the above example, if the callee non-canonical telephone number does not contain a segment indicating the country, and the caller canonical telephone number indicates that the caller telephone is located within the North American Numbering Plan, the callee subscriber telephone number will be assumed to also be in the North American Numbering Plan. The expansion analyzer 54 can then apply the known rules of the North America Numbering Plan to the callee non-canonical telephone number to expand it into canonical form. Similarly, a callee telephone number that includes only a subscriber number will be assumed to have the same country code and area code as the caller canonical telephone number.

The system 10 stores the caller canonical telephone number in the station information storage area 36 (see FIG. 1). Typically, the caller canonical telephone number does not change because the caller location is constant. However, the system 10 may be a portable system that the user can take anywhere in the world. For example, the phone book storage 18 could contain a list of business telephone numbers that a businessman takes on a trip. In that event, the user enters the canonical telephone number of his current location into the system 10 using the keypad 16.

The system 10 stores the new caller canonical telephone number in the station information storage area 36. The system 10 thus permits the simple updating of the current caller canonical telephone number, and processes callee canonical and non-canonical telephone numbers automatically. The expansion analyzer 54 uses the current caller canonical telephone number to determine what missing segments will be substituted into the callee non-canonical telephone number. The expansion analyzer 54 can also use the current caller canonical telephone number to determine the country in which the caller is located. This knowledge can be used to determine which telephone numbering rules to apply to the callee non-canonical telephone number.

In some cases, the expansion analyzer 54 can detect clues that assist in determining the callee canonical telephone number. For example, the expansion analyzer 54 can match the beginning of the callee non-canonical telephone number to known exchange prefixes to determine if there is a match. A match is used by the expansion analyzer 54 to identify the location of the callee non-canonical telephone number. Similarly, the expansion analyzer 54 can check the segments of the callee non-canonical telephone number to determine if a particular segment matches a known country code. If the country code is identified by the system 10, the particular country may use area codes that can be subsequently identified by the system. The expansion analyzer 54 identifies any sequence of one or more of the characters "0" through "9" as a digit segment, and any sequence of one or more other characters as a "non-digit segment."

Other clues may be derived by the expansion analyzer 54 by examining the maimer in which the user divided up the callee non-canonical telephone number stored in the phone book storage area 18 (see FIG. 1). International standards for telephonic communication are established by The International Telegraph and Telephone Consultative Committee (CCITT) now known as The International Telecommunications Union—Telecommunications Standards Sector (ITU-T). The (CCITT) recommendation E. 123 provides guidelines for representing area codes within a country, and states that the area code should be placed within parentheses. The expansion analyzer 54 analyzes digit segments to determine if any digit segment is enclosed by a parentheses. If so, it is likely that the digit segment enclosed by the parentheses is an area code. For example, the user may have stored the callee non-canonical telephone number as (206) 555-1234. The expansion analyzer 54 uses this information to determine that the first digit segment, contained within the parentheses, is an area code, and that the hyphen divides the subscriber number into the exchange prefix and the individual telephone number. Any digits that precede the digit segment contained with the parentheses (i.e., the area code) are likely to be a country code. The expansion analyzer 54 analyzes the digit segment preceding the area code to determine if it matches any known country code.

In other cases, the user may have stored the callee non-canonical telephone number as a single string, such as 2065551234, where no digit segments can be identified by the manner in which the user stored the callee non-canonical telephone number. In this event, the expansion analyzer 54 analyzes the digits one or more at a time to determine if they match any known codes. This ability to separate a single string of digits into digit segments depends on the extent of knowledge about the telephone numbering rules in the particular country. For example, if the system 10 is used in North America, the single string of digits can be segmented on the basis of the total number of digits in the string. For example, if there are exactly seven digits in the string, the expansion analyzer 54 assumes that the digits represent the callee subscriber number. Similarly, if there are ten digits, as in the example above with the string 2065551234, the expansion analyzer 54 assumes that the string represents the callee area code and subscriber number.

The system 10 permits the simple use of features such as the automatic insertion of a caller identification such as a calling card number. The calling card number is stored within the system 10 in encrypted form to prevent unauthorized access. The calling card number may be stored on the disk 22 (see FIG. 1) or other convenient location such as the station information storage area 36. The user can select a calling card option to indicate that the system 10 should use the calling card number to place a particular phone call.

The system 10 can be programmed to contain the access number of the long distance carrier selected by the user. Such long distance carrier may be designated as a Preferred Interchange Carrier (PIC) for the user. The system 10 can also be programmed by the user to wait for tones generated on the telephone exchange 12 by the PIC or other long distance carrier. For example, some long distance carriers require the user to call an access number and wait for a "bong" tone, then enter the calling card number. The system 10 can be programmed to automatically wait for such bong tones before transmitting the calling card number.

In the presently preferred embodiment, the system 10 uses the "$" character to indicate that the system must wait for a tone before transmitting any more digits. For example, there are three different techniques used to access AT&T® long distance service. If AT&T® is the PIC for a particular caller, the system 10 need only precede the callee telephone number with the long distance prefix "1" to access the long distance service. Thus, the system 10 dials 1 206 555-1234 to dial the Seattle area telephone number used in the examples above. However, the user must dial 10288 to access the AT&T® long distance service if AT&T® is not the PIC for the present location of the user. As a third alternative, the user may dial 1 800 321-0288 to access the AT&T® long distance service if AT&T® is not the PIC. If the user has a calling card number to transmit, the user can program the system 10 to wait for bong tones before proceeding with the transmission of the final callee telephone number or the user calling card number. For example, if the user is manually dialing a callee using the above toll-free number, the user dials 1 800 321-0288, waits for a bong tone, enters the final callee telephone number (206 555-1234 in the above example), waits for a second bong tone, and enters the calling card number.

In the presently preferred embodiment, the user enters a calling card number for each type of long distance access. For example, the same calling card number may be used for each type of AT&T® long distance access described above. The calling card numbers are entered into the system 10 only one time for each type of long distance access and are stored within the system. The user presses a calling card button on the keypad 16 (see FIG. 1 ) to place a long distance call using the calling card. The system 10 displays a menu on the display 24 to show the different calling card options available to the user. The user selects the desired calling card option, and the system 10 inserts the calling card number in the proper position. The system also inserts delays into the sequence of numbers to assure that the long distance carrier will receive the numbers at the appropriate time.

Thus, the system 10 assembles the necessary numbers and sequentially transmits the numbers over the telephone exchange 12 (see FIG. 1) with the proper delays. The sequence of digits dialed by the system 10 in the above example is 1 800 3210288 $ 206 555-1234 $ XYZ, where XYZ is the user calling card number that has previously been entered into the system. The numbers for the desired long distance carrier can be entered into the system 10 in the number previously described and stored in the phone book storage area 18. It should be noted that other long distance carriers have similar access procedures. The user can easily enter and store the necessary access numbers in the system 10. The system 10 can support a plurality of calling card numbers as well. For example, the user may have a business calling card that uses a first long distance carrier and a personal calling card that uses a different long distance carrier.

If the system 10 is portable, the telephone interface 32 (see FIG. 1) can include a speaker 33 that the user can hold tip to the telephone handset (not shown) to play the dialing tones for the final callee telephone number. Thus, the user can carry a small portable device containing the system 10 that stores a large number of telephone numbers and can be programmed by the user to operate in any location throughout the world.

The system 10 also has the ability to learn unique dialing rules and apply the unique rules in subsequent operations. For example, there are locations in which telephone calls within the same area code require dialing the long distance prefix. For example, some subscriber numbers in the Seattle area require dialing a "1" long distance prefix and the area code (206) even through the caller canonical telephone number is also in the 206 area code. In normal operation, the system 10 would delete the area code when dialing the callee telephone number (206) 555-1234 from a caller canonical telephone number with the same area code. The system 10 may attempt to complete the telephone call without adding the long distance prefix and area code. In that event, the call placement will fail. The user can simply press an "Add Toll" button on the keypad 16 (see FIG. 1) or on the display 24 if the display has a touch-sensitive screen. The system 10 will add back the area code previously deleted and will also add the appropriate long distance prefix. The system 10 now knows that the particular telephone exchange prefix associated with the final callee telephone number requires the long distance prefix and area code to properly complete the connection. In this situation, the system 10 stores the information relating the particular telephone exchange prefix to the required long distance prefix will remember to automatically add the long distance prefix and area code for any subsequent telephone calls placed to any callee having the same exchange prefix.

The correct operation of the expansion analyzer 54 depends on the proper identification of the callee country and the application of the numbering rules applicable to the callee country. The expansion analyzer 54 must identify the callee country in order to properly apply the numbering rules contained in the rule storage area 52. For example, the North American Numbering Plan specifies that the subscriber number comprises seven digits, three of which are the exchange prefix, with the remaining four digits identifying the individual telephone number. Long distance codes in the North American Numbering Plan are three digits that are generally segmented by the use of parentheses, as previously described.

Figure 4A:
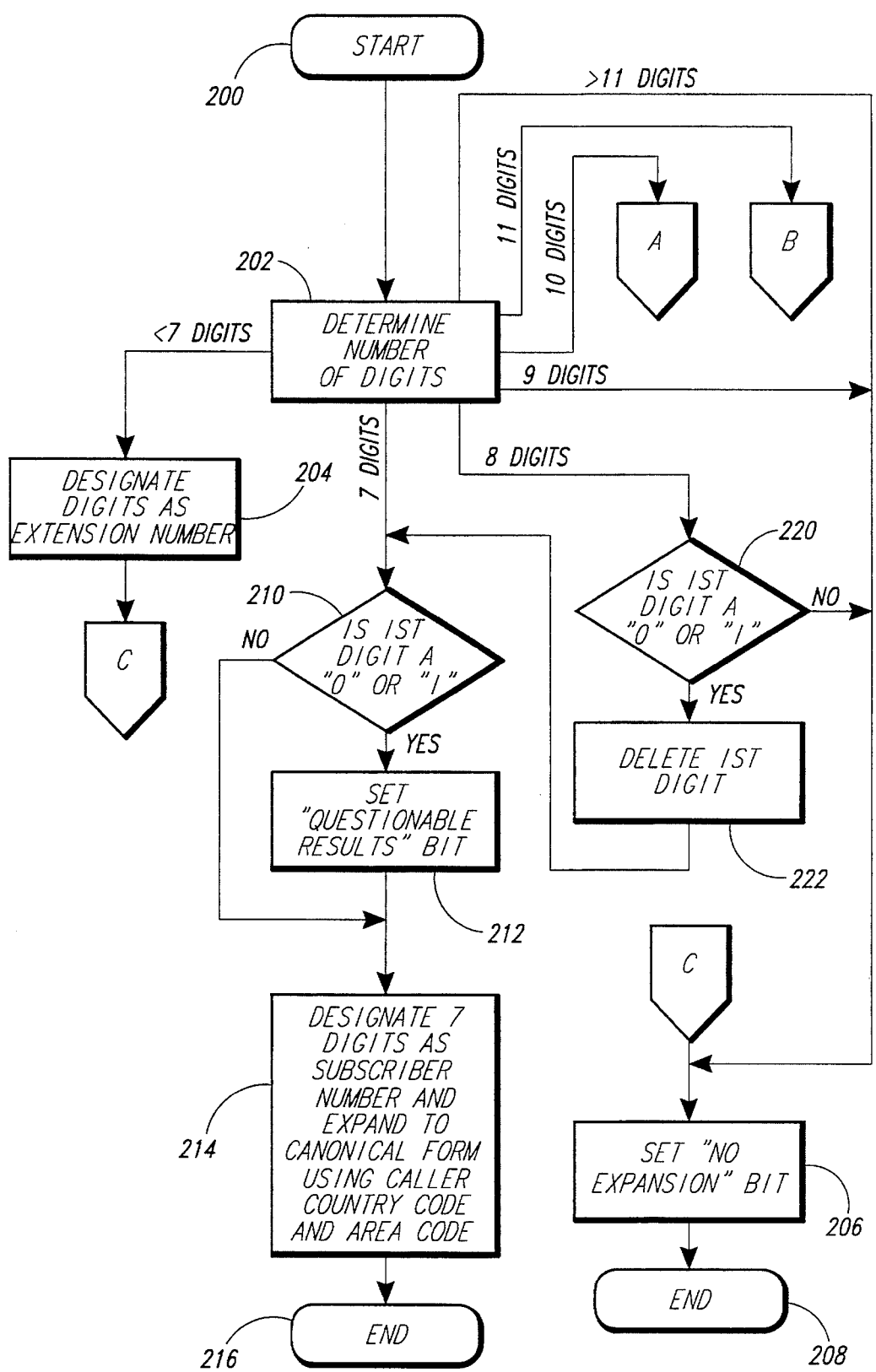
FIG. 4A is a flowchart of the operation of the expansion circuit of FIG. 3 for a North American Numbering Plan.
Figure 4B:
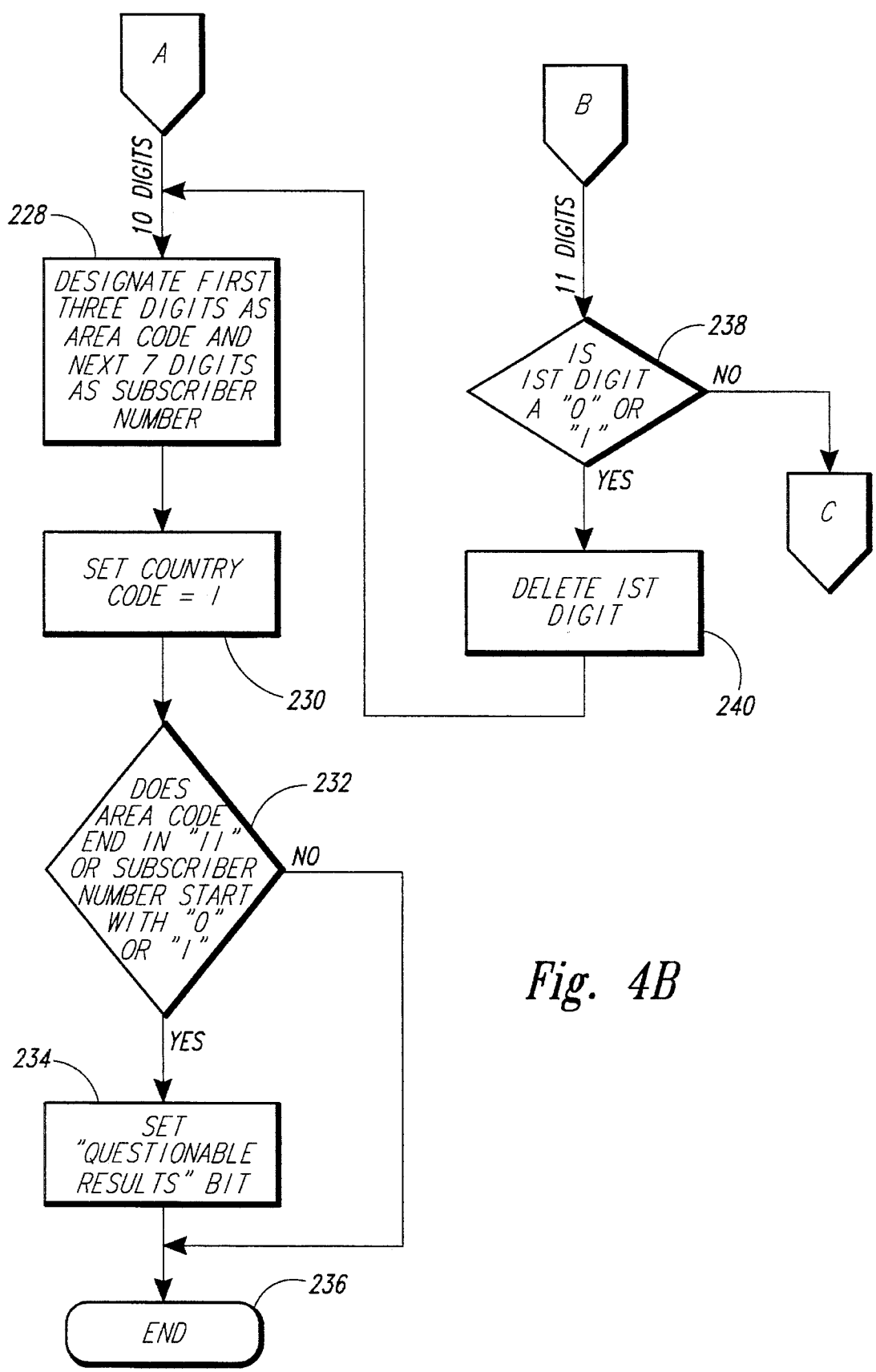
FIG. 4B is a continuation of the flow chart of FIG. 4A.

The operation of the expansion analyzer 54 in the North American Numbering Plan is illustrated in the flowcharts of FIGS. 4A and 4B. At the start, step 200 in FIG. 4A, the calling analyzer 54 has determined that the callee non-canonical telephone number is within the North American Numbering Plan. In step 202, the expansion analyzer 54 determines the number of digits present in the callee non-canonical telephone number. If there are less than seven digits in a callee non-canonical telephone number, the expansion analyzer 54, in step 204, designates those digits as an extension number and does not attempt an expansion. In step 206, the expansion analyzer 54 sets a "NO EXPANSION" bit to indicate to the user that an expansion was not performed. Setting the NO EXPANSION bit causes the display of a dialog box on the display 24 (see FIG. 1) to indicate to the user that the callee non-canonical telephone number has not been expanded. The expansion analyzer 54 ends the expansion attempt in step 208.

If step 202 determined that there were exactly seven digits in the callee non-canonical telephone number, the expansion analyzer 54 determines, in decision 210, whether the first digit is a "0" or a "1". If the first digit is a "0" or a "1", the result of decision 210 is YES and in step 212, the expansion analyzer 54 sets the "QUESTIONABLE RESULTS" bit. The expansion analyzer 54 will expand a callee non-canonical telephone number even though the QUESTIONABLE RESULTS bit was set in step 212; however, the user is notified that the results may not be accurate. Setting the QUESTIONABLE RESULTS bit causes the display of a dialog box on the display 24 (see FIG. 1) to indicate to the user that the results are questionable. The user is asked to confirm the expanded callee non-canonical telephone number prior to dialing. If the first digit is not a "0" or a "1", the results of decision 210 are NO and in step 214, the expansion analyzer 54 designates the seven digits as the callee subscriber number. The expansion analyzer 54 expands the callee non-canonical telephone number to canonical form using the caller country code and area code. The expansion analyzer 54 ends the expansion in step 216.

If step 202 has determined there are eight digits in the callee non-canonical telephone number, the expansion analyzer 54, in decision 220, determines whether the first digit is a "0" or a "1". If the first digit of the eight digit callee non-canonical telephone number is a "0" or a "1", the result of decision 220 is YES and in step 222, the expansion analyzer 54 deletes the first digit. Following the deletion of the first digit in step 222, the callee non-canonical telephone number has seven remaining digits. The expansion analyzer 54 goes to decision 210 and processes the remaining seven digits in the same manner as previously described for a seven digit callee non-canonical telephone number. If the first digit of the eight digit callee non-canonical telephone number was not a "0" or a "1", the result of decision 220 is NO, and in step 206 the expansion analyzer 54 sets the NO expansion bit to indicate to the user that an expansion was not performed on callee non-canonical telephone number.

If step 202 determines that there are nine digits in the callee non-canonical telephone number, the expansion analyzer 54 does not attempt expansion, but sets the NO expansion bit in step 206. Similarly, if more than eleven digits are present in the callee non-canonical telephone number, the expansion analyzer sets the NO expansion bit in step 206 and does not attempt to expand the callee non-canonical telephone number.

If the expansion analyzer 54 determines that there are ten digits in step 202, the expansion analyzer 54 in step 228, shown in FIG. 4B, designates the first three digits as the callee area code and the next seven digits as the callee subscriber number. In step 230, the expansion analyzer 54 sets the country code equal to one. In decision 232, the expansion analyzer 54 determines whether the area code ends in a "11" or if the subscriber number starts with a "0" or a "1". If the area code does end in a "11" or the subscriber number starts with a "0" or a "1", the result of decision 232 is YES and in step 234, the expansion analyzer 54 sets the QUESTIONABLE RESULTS bit and ends the expansion process in step 236. As previously described, setting the QUESTIONABLE RESULTS bit causes a dialog box to be displayed on the display 24, asking the user to confirm the expanded callee non-canonical telephone number prior to dialing. If the area code does not end in a "11" and the subscriber number does not start with a "0" or a "1", the result of decision 232 is NO and the expansion analyzer 54 ends the expansion process in step 236.

If the expansion analyzer determines that there are eleven digits in a non-canonical telephone number in step 202, shown in FIG. 4A, the expansion analyzer 54 determines whether the first digit is a "0" or a "1" in decision 238, shown in FIG. 4B. If the first digit of the eleven digit callee non-canonical telephone number is a "0" or a "1", the result of decision 238 is YES and in step 240, the expansion analyzer 54 deletes the first digit. Following deletion of the first digit, there are ten digits in the callee non-canonical telephone number and the expansion analyzer 54 moves to step 228 and process the remaining ten digits in the same manner as previously described for a ten digit callee non-canonical telephone number. If the first digit of the eleven digit callee non-canonical telephone number is not a "0" or a "1", the result of decision 238 is NO and the expansion analyzer 54 sets the NO EXPANSION BIT in step 206 shown in FIG. 4A and does not attempt to expand the eleven digit callee non-canonical telephone number.

As can readily be appreciated, different countries have numerous different numbering rules. For example, some countries, such as those in the former Soviet Union, have variable length long distance codes that identify each city. The larger cities have fewer digits in the long distance code, while villages and smaller cities have a greater number of digits. Other countries have few or no long distance codes. For example, France has a single long distance code to identify Paris telephone numbers. Any telephone outside of Paris does not use the long distance code. Thus, a callee telephone number in Paris requires a "1" digit to identify Paris. Any number to a telephone outside of Paris will not have a long distance code. Some countries have fewer digits in the subscriber number than does the North American Numbering Plan. For example, some areas in Iceland use a three digit subscriber number and a four to five digit long distance code.

The expansion analyzer 54 will attempt to identify the callee country so that the proper numbering rules can be applied using the role storage area 52. If the callee non-canonical telephone number does not contain a country code, the expansion analyzer will use the country code from the caller canonical telephone number, which is stored in the station information storage area 36 (see FIG. 1). If the callee non-canonical number cannot be properly identified using the caller country numbering rules, the expansion analyzer 54 will not attempt the expansion.

Figure 5A:
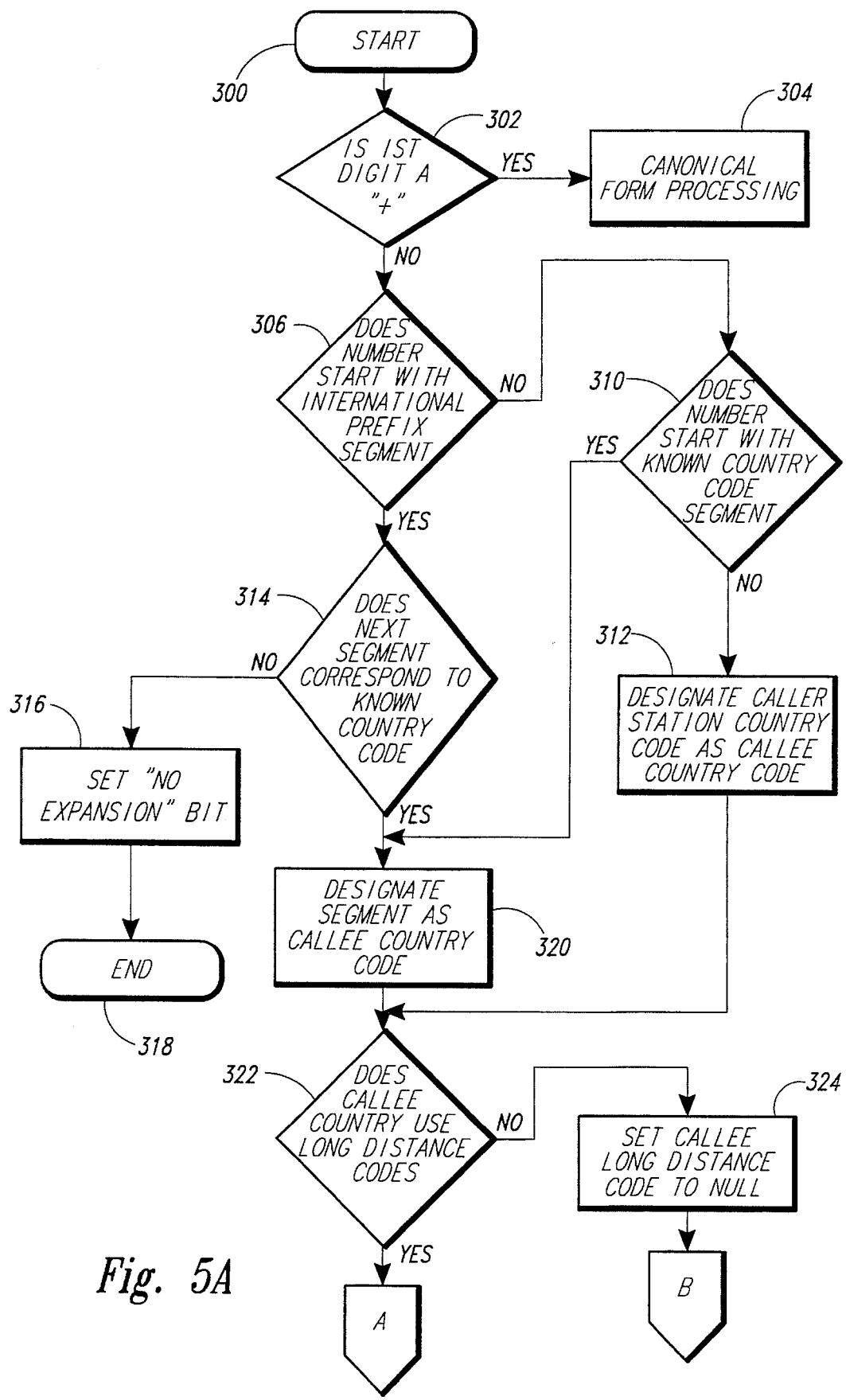
FIG. 5A is a flowchart of the general operation of the expansion circuit of FIG. 3.
Figure 5B:
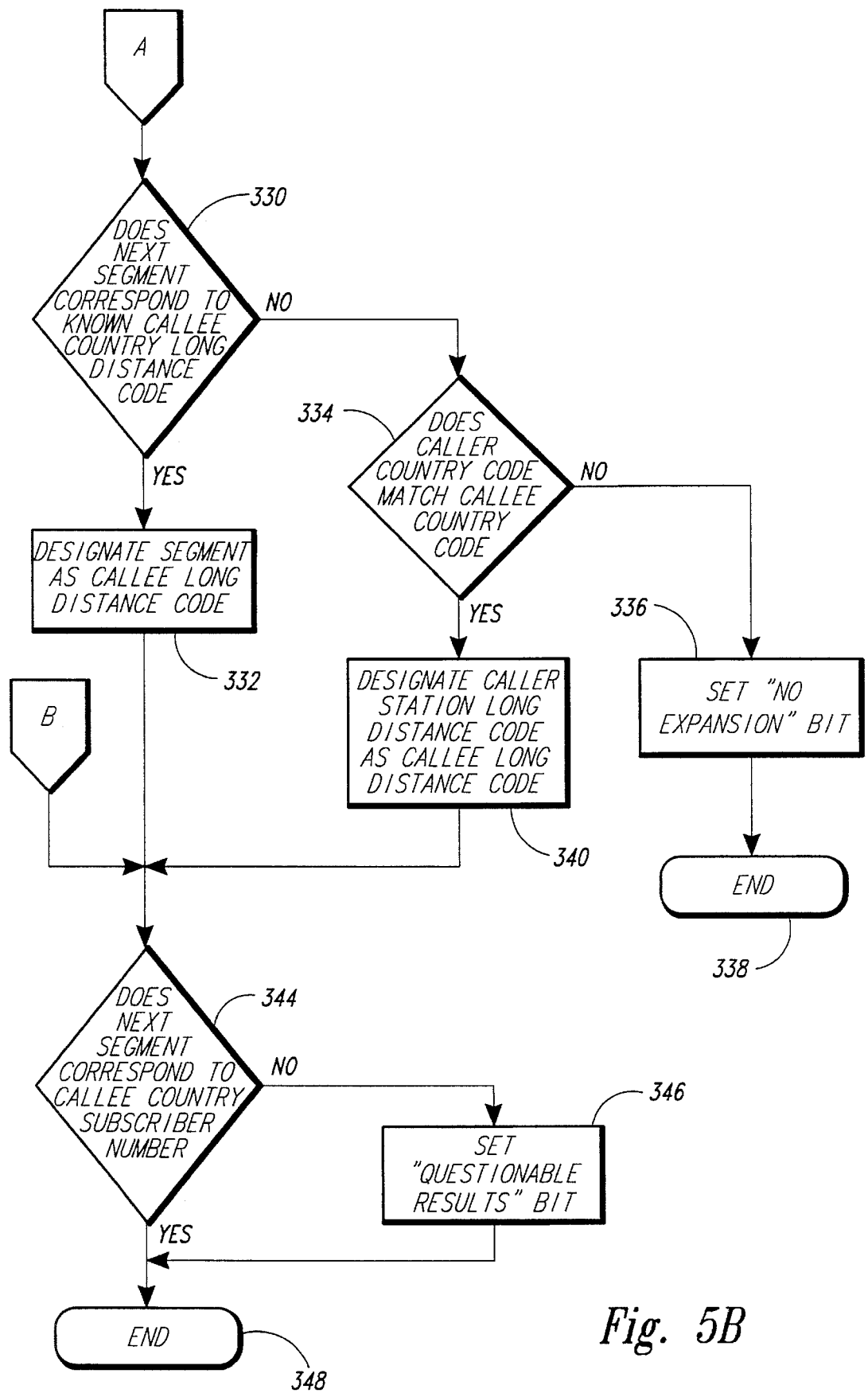
FIG. 5B is a continuation of the flow chart of FIG. 5A.

The general operation of the expansion analyzer 54 is illustrated in the flowcharts of FIGS. 5A and 5B. The expansion analyzer 54 begins processing telephone numbers at 300, shown in FIG. 5A. In decision 302, the expansion analyzer 54 determines whether the first digit is a "+." If the first digit is a "+", the result of decision 302 is YES. This indicates that the callee telephone number is in canonical form. In step 304, the system 10 performs the canonical form processing as discussed in relation to FIGS. 2A and 2B. If the first digit is not a "+", the result of decision 302 is NO. In that case, in decision 306, the expansion analyzer 54 determines whether the first segment of the callee non-canonical telephone number is an international prefix segment. If the first segment of the callee non-canonical telephone number is not an international prefix segment, the result of decision 306 is NO and in decision 310, the expansion analyzer 54 determines whether the first segment of the callee non-canonical telephone number is a known country code. If the first segment of the callee non-canonical telephone number is not a known country code segment, the result of decision 310 is NO and in step 312, the expansion analyzer 54 designates the caller station country code as the callee country code.

If the first segment of the callee non-canonical telephone number is an international prefix segment, the result of decision 306 is YES. In that event, the expansion analyzer 54, in decision 314, determines whether the next sequential segment of the callee non-canonical telephone number corresponds to a known country code. If the next sequential segment of the callee non-canonical telephone number does not correspond to a known country code, the result of decision 314 is NO. In that event, the expansion analyzer 54 sets the NO EXPANSION bit in step 316 and does not attempt to expand the callee non-canonical telephone number. Setting the NO EXPANSION bit causes the display of a dialog box on the display 24 (see FIG. 1) to indicate to the user that the callee non-canonical telephone number has not been expanded. The expansion analyzer 54 ends the expansion attempt in step 318.

If the next sequential segment of the callee non-canonical telephone number does correspond to a known country code, the result of decision 314 is YES. In that event, the expansion analyzer 54 designates the segment as the callee country code in step 320. Similarly, if the first segment of the callee non-canonical telephone number was a known country code, the result of decision 310 is YES, and in step 320 the expansion analyzer 54 designates the first segment as the callee country code.

In decision 322, the expansion analyzer determines whether the callee country uses long distance codes. If the callee country does not use long distance, the result of decision 322 is NO and, in step 324, the expansion analyzer 54 sets the callee long distance code to a null value. Following step 324, the expansion analyzer continues the expansion process in FIG. 5B.

If the callee country does use long distance codes, the result of decision 322 is YES and in decision 330, shown in FIG. 5B, the expansion analyzer 54 determines whether the next sequential segment of the callee non-canonical telephone number corresponds to a known callee country long distance code. If the next sequential segment of the callee non-canonical telephone number does correspond to a known callee country long distance code, the result of decision 330 is YES, and the expansion analyzer 54 designates that segment of the callee non-canonical telephone number as the callee long distance code in step 332.

If the next sequential segment does not correspond to a known callee country long distance code, the result of decision 330 is NO. In that event, the expansion analyzer 54 determines whether the caller country code matches the callee country code in decision 334. If the caller country code does not match the callee country code, the result of decision 334 is NO and, in step 336, the expansion analyzer sets the NO EXPANSION bit. As previously indicated, setting the NO EXPANSION bit causes the display of a dialog box on the display 24 (see FIG. 1) to indicate to the user that the callee non-canonical telephone number has not been expanded. The expansion analyzer 54 ends the expansion attempt in step 338.

If the caller country code does match the callee country code, the result of decision 334 is YES, and in step 340, the expansion analyzer 54 designates the caller station long distance code as the callee long distance code.

If the callee long distance code was set to a null value in step 324, shown in FIG. 5A, or if a segment was designated as the callee long distance code in step 332, or if the caller station long distance code was designated as the callee long distance code in step 340, the expansion analyzer 54 analyzes the next sequential segment in decision 344 to determine if the next sequential segment corresponds to a callee country subscriber number. If the segment does not correspond to a callee country subscriber number, the result of decision 344 is NO, and in step 346, the expansion analyzer 54 sets the QUESTIONABLE RESULTS bit. The expansion analyzer 54 will expand a callee non-canonical telephone number even though the QUESTIONABLE RESULTS bit was set in step 346; however, the user is notified that the results may not be accurate. Setting the QUESTIONABLE RESULTS bit causes the display of a dialog box on the display 24 (see FIG. 1) to indicate to the user that the results are questionable. The user is asked to confirm the expanded callee non-canonical telephone number prior to dialing. Following the setting of the QUESTIONABLE RESULTS bit in step 346, the expansion analyzer ends the expansion process in step 348.

If the next sequential segment of the callee non-canonical telephone number does correspond to a callee country subscriber number, the result of decision 344 is YES, and the expansion analyzer 54 ends the expansion process in step 348 without setting the QUESTIONABLE RESULTS bit.

Thus, the system 10 attempts to expand the callee non-canonical telephone number in accordance with the telephone numbering rules of the designated callee country. In certain situations, the callee non-canonical telephone number cannot be expanded or produces questionable results. If a sufficient amount of the callee non-canonical telephone number is present to permit the identification of the callee country, the telephone numbering rules of that country will be applied, or the expansion analyzer 54 will attempt to apply the telephone numbering rules of the caller country.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for telephonic communication from a first location coupled to a telephone exchange, the system comprising:

a station information storage area storing a station canonical telephone number for the first location, said station canonical telephone number having at least first and second portions;

a phone book storage area for storing at least a first non-canonical telephone number for a location other than the first location;

selection means for permitting a user to select one of said stored non-canonical telephone numbers from said phone book storage area;

an expansion analyzer analyzing said selected non-canonical telephone number to determine if said selected non-canonical telephone number contains a first portion corresponding to said first portion of said station canonical telephone number, said expansion analyzer expanding said selected non-canonical telephone number by adding said first portion of said station canonical telephone number to said selected non-canonical telephone number if said selected non-canonical telephone number does not contain said first portion, whereby said expanded non-canonical telephone number will contain first and second portions corresponding to said first and second portions of said station canonical telephone number;

matching means for sequentially comparing said first and second portions of said station canonical telephone number with said corresponding first and second portions of said expanded non-canonical telephone number, said matching means comparing said first portion of said station canonical telephone with said corresponding first portion of said expanded non-canonical telephone number and generating a first match signal if said first portion of said station canonical telephone number matches said corresponding first portion of said expanded non-canonical telephone number, said matching means comparing said second portion of said station canonical telephone with said corresponding second portion of said expanded non-canonical telephone number only if said first match signal was generated, and generating a second match signal if said second portion of said station canonical telephone number matches said corresponding second portion of said expanded non-canonical telephone number; and alteration means for deleting said first portion of said expanded canonical telephone number in response to said first match signal, and deleting said second portion of said expanded canonical telephone number in response to said second match signal to generate a callee telephone number.

2. The system of claim 1, further including a dialer generating dialing signals on the telephone exchange to initiate telephonic communication to said callee telephone number.

3. The system of claim 1 wherein said station information storage area contains a plurality of telephone prefixes, the system further including adder means for adding a selected one of said prefixes to said callee telephone number to generate a final callee telephone number, said dialer generating dialing signals on the telephone exchange to initiate telephonic communication to said final callee telephone number.

4. The system of claim 1 for use with a telephone exchange using a user code for billing purposes, the system further including a user identification storage area containing the user code used for billing purposes, and adder means for adding the user code to said callee telephone number in response to the user selection of the user code for billing purposes.

5. The system of claim 1 wherein said phone book storage area contains an interchange carrier telephone number for a designated long distance carrier, the system further including adder means for adding said interchange carrier telephone number to said callee telephone number to permit telephonic communication to said callee telephone number using said designated long distance carrier.

6. The system of claim 1 wherein said first portion of said station canonical telephone number comprises one of a country code and a long distance code.

7. The system of claim 1 wherein said first and second portions of said station canonical telephone number comprises a long distance code and a subscriber telephone number for said station canonical telephone number, respectively.

8. The system of claim 1, further including manual entry means for manually entering said callee telephone number into said phone book storage area by a user.

9. A system for telephonic communication from a first location coupled to a telephone exchange, the system comprising:

a station information storage area storing a station canonical telephone number for the first location, said station canonical telephone number having at least first and second portions;

a phone book storage area for storing at least a first non-canonical telephone number for a location other than the first location;

selection means for permitting a user to select one of said stored non-canonical telephone numbers from said phone book storage area; and an expansion analyzer analyzing said selected non-canonical telephone number to determine if said selected non-canonical telephone number contains a first portion corresponding to said first portion of said station canonical telephone number, said expansion analyzer expanding said selected non-canonical telephone number by adding said first portion of said station canonical telephone number to said selected non-canonical telephone number if said selected non-canonical telephone number does not contain said first portion, whereby said expanded non-canonical telephone number will contain said first portion corresponding to said first portion of said station canonical telephone number.

10. The system of claim 9 wherein said expansion analyzer further analyzes said selected non-canonical telephone number to determine if said selected non-canonical telephone number contains a second portion corresponding to said second portion of said station canonical telephone number, said expansion analyzer further expanding said selected non-canonical telephone number by adding said second portion of said station canonical telephone number to said selected non-canonical telephone number if said selected non-canonical telephone number does not contain said second portion, whereby said further expanded non-canonical telephone number will contain said first and second portions corresponding to said first and second portions of said station canonical telephone number.

11. The system of claim 10 wherein said first portion of said station canonical telephone number comprises one of a country code and a long distance code.

12. The system of claim 9, further including a dialer generating dialing signals on the telephone exchange to initiate telephonic communication to said expanded non-canonical telephone number.

13. The system of claim 9, further including manual entry means for manually entering said callee telephone number into said phone book storage area by a user.

14. The system of claim 9 wherein said phone book storage area contains an interchange carrier telephone number for a designated long distance carrier, the system further including adder means for adding said interchange carrier telephone number to said expanded non-canonical telephone number to permit telephonic communication to said expanded non-canonical telephone number using said designated long distance carrier.

15. The system of claim 14, further including a dialer generating dialing signals on the telephone exchange to initiate telephonic communication to said expanded non-canonical telephone number, said dialing signals including dialing signals for said preferred interchange carrier telephone number to per,nit telephonic communication to said expanded non-canonical telephone number using said designated long distance carrier.

16. A system for telephonic communication from a first location coupled to a telephone exchange, the system comprising:

a data storage table containing a plurality of country codes identifying the telephone exchange of individual countries and a plurality of long distance codes corresponding to long distance codes if any for each of said individual countries;

a phone book storage area for storing at least a first non-canonical telephone number for a location other than the first location;

selection means for permitting a user to select one of said stored non-canonical telephone numbers from said phone book storage area; and an expansion analyzer analyzing said selected non-canonical telephone number to determine if said selected non-canonical telephone number contains a first portion corresponding to one of said plurality of country codes in said data table and designating said first portion as said one country code if said first portion contains said one country code, said expansion analyzer further analyzing said selected non-canonical telephone number to determine if said selected non-canonical telephone number contains a second portion corresponding to one of said plurality of long distance codes in said data table corresponding to said one country code and designating said second portion as said one long distance code if said second portion contains said one long distance code.

17. The system of claim 16, further including a station information storage area storing a station canonical telephone number for the first location, said station canonical telephone number having an country code portion and a long distance code portion, said expansion analyzer expanding said selected non-canonical telephone number by adding said country code portion of said station canonical telephone number to said selected non-canonical telephone number if said selected non-canonical telephone number does not contain said first portion corresponding to one of said plurality of country codes in said data table, said expansion analyzer further expanding said selected non-canonical telephone number by adding said long distance code portion of said station canonical telephone number to said selected non-canonical telephone number if said selected non-canonical telephone number does not contain said second portion corresponding to one of said plurality of long distance codes in said data table, whereby said expanded non-canonical telephone number will contain said first and second portions corresponding to country code and long distance code portions, respectively.

18. A system for telephonic communication from a first location coupled to a telephone exchange, the system comprising:

a data storage table containing a plurality of country codes identifying the telephone exchange of individual countries and a plurality of long distance codes corresponding to long distance codes for each of said individual countries that use long distance codes;

a station information storage area storing a station canonical telephone number for the first location, said station canonical telephone number having a country code portion, a long distance code portion, and a subscriber number portion;

data entry means for permitting a user to enter a non-canonical telephone number for a location other than the first location; and an expansion analyzer analyzing said non-canonical telephone number to determine a number of digits in said non-canonical telephone number and processing said non-canonical telephone number in a manner dependent on said determined number of digits, said expansion analyzer expanding said non-canonical telephone number by adding said country code portion and said long distance code portion of said station canonical telephone number if said determined number of digits corresponds to the number of digits in said subscriber number portion of said station canonical telephone number, said expansion analyzer expanding said non-canonical telephone number by adding said country code portion of said station canonical telephone number if said determined number of digits corresponds to the number of digits in said long distance code portion and said subscriber number portion of said station canonical telephone number.

19. The system of claim 18 wherein said station information storage area contains a plurality of telephone prefixes corresponding to long distance calling prefixes and international calling prefixes, the system further including a prefix adder means for adding a selected one of said prefixes to said callee telephone number to generate a final callee telephone number.

20. The system of claim 18 wherein said station information storage area contains a plurality of telephone prefixes corresponding to long distance calling prefixes and international calling prefixes, said expansion analyzer deleting a callee long distance prefix from said non-canonical telephone number if said determined number of digits corresponds to the number of digits in said subscriber number portion of said station canonical telephone number and said long distance prefix.

21. The system of claim 18 wherein said station information storage area contains an interchange carrier telephone number for a designated long distance carrier, the system further including adder means for adding said interchange carrier telephone number to said expanded non-canonical telephone number to permit telephonic communication to said expanded non-canonical telephone number using said designated long distance carrier.

22. The system of claim 18 for use with a telephone exchange using a user code for billing purposes, the system further including a user identification storage area containing the user code used for billing purposes, said expansion analyzer adding the user code to said expanded non-canonical telephone number in response to the user selection of the user code for billing purposes.

23. A system for telephonic communication from a first location coupled to a telephone exchange, the system comprising:

a station information storage area storing a station canonical telephone number for the first location, said station canonical telephone number having least first and second portions;

data entry means for permitting a user to enter a non-canonical telephone number for a location other than the first location; and an expansion analyzer analyzing said non-canonical telephone number to determine if said non-canonical telephone number contains a first portion corresponding to said first portion of said station canonical telephone number, said expansion analyzer expanding said non-canonical telephone number by adding said first portion of said station canonical telephone number to said non-canonical telephone number if said non-canonical telephone number does not contain said first portion, whereby said expanded non-canonical telephone number will contain said first portion of said station canonical telephone number.

24. The system of claim 23 wherein said expansion analyzer further analyzes said non-canonical telephone number to determine if said non-canonical telephone number contains a second portion corresponding to said second portion of said station canonical telephone number, said expansion analyzer further expanding said non-canonical telephone number by adding said second portion of said station canonical telephone number to said non-canonical telephone number if said non-canonical telephone number does not contain said second portion, whereby said further expanded non-canonical telephone number will contain said first and second portions corresponding to said first and second portions of said station canonical telephone number.

25. The system of claim 23 wherein said station information storage area contains a preferred interchange carrier telephone number for a designated long distance carrier, the system further including adder means for adding said preferred interchange carrier telephone number to said expanded non-canonical telephone number to permit telephonic communication to said expanded non-canonical telephone number using said designated long distance carrier.

26. The system of claim 23 for use with a telephone exchange using a user code for billing purposes, wherein said station information storage area contains the user code used for billing purposes, said expansion analyzer adding the user code to said expanded non-canonical telephone number in response to the user selection of the user code for 27. The system of claim 23 wherein said first portion of said station canonical telephone number comprises one of a country, code and a long distance code.

28. The system of claim 23, further including a dialer generating dialing signals on the telephone exchange to initiate telephonic communication to said expanded non-canonical telephone number.

29. The system of claim 28 wherein said dialer includes a speaker to acoustically couple the system to the telephone exchange to transmit said dialing signals to the telephone exchange.

30. The system of claim 23, further including station alteration means for altering said station canonical telephone number and storing said altered station canonical telephone number in said station information storage area, said expansion analyzer using said altered station canonical telephone number to analyze said non-canonical telephone number.

31. The system of claim 23 wherein said data entry means includes a keypad to permit the manual entry of said non-canonical telephone number by a user.

32. The system of claim 23 wherein said data entry means includes a touch sensitive display to permit the manual entry of said non-canonical telephone number by a user.

33. The system of claim 23, further including a phone book storage area storing a plurality of non-canonical telephone numbers for locations other than the first location, and selection means for selecting one of said plurality of stored non-canonical telephone numbers from said phone book storage area as said non-canonical telephone number.

34. The system of claim 33 wherein said phone book storage area contains an interchange career telephone number for a designated long distance carrier, the system further including adder means for adding said interchange carrier telephone number to said expanded non-canonical telephone number to permit telephonic communication to said expanded non-canonical telephone number using said designated long distance carrier.

35. The system of claim 23, further including canonical processing means for processing said expanded non-canonical telephone number by comparing said first portion of said station canonical telephone number to said first corresponding first portion of said expanded non-canonical telephone number and deleting said first portion of said expanded non-canonical telephone number if said first portion of said station canonical telephone number matches said first corresponding first portion of said expanded non-canonical telephone number to generate a callee telephone number.

36. The system of claim 35 wherein said station information storage area contains a plurality of telephone prefixes corresponding to long distance calling prefixes and international calling prefixes, the system further including a prefix adder means for adding a selected one of said prefixes to said callee telephone number to generate a final callee telephone number.

37. The system of claim 35, further including correction means for permitting the user to generate a corrected callee telephone number if said first portion of said expanded non-canonical telephone number was deleted by said canonical processing means, said correction means restoring said first portion of said expanded non-canonical telephone number to generate said callee telephone number.

38. The system of claim 37, further including memory means for generating said corrected callee telephone number in subsequent telephone calls from the first location to said non-canonical telephone number.

39. A system for telephonic communication from a first location coupled to a telephone exchange, the system comprising:

a station information storage area storing a station canonical telephone number for the first location, said station canonical telephone number having at least first and second portions;

a rule storage area containing telephone numbering rules for a plurality of countries;

data entry means for permitting a user to enter a non-canonical telephone number for a location other than the first location; and an expansion analyzer analyzing said non-canonical telephone number to determine if said non-canonical telephone number contains a first portion corresponding to a country code for a particular one of said plurality of countries, said expansion analyzer expanding said non-canonical telephone number using telephone numbering rules for said particular country if said first portion of said non-canonical telephone number corresponds to said particular country, said expansion analyzer expanding said non-canonical telephone number by adding said first portion of said station canonical telephone number to said non-canonical telephone number if said first portion of said non-canonical telephone number does not correspond to said country code for any of said plurality of countries.

40. A system for telephonic communication from a first location, the system comprising:

a station information storage area storing a station canonical telephone number for the first location, said station canonical telephone number having at least first and second portions:

data entry means for permitting a user to enter a non-canonical telephone number for a second location different from the first location;

a telephone exchange coupling the first location to said second location; and an expansion analyzer analyzing said non-canonical telephone number to determine if said non-canonical telephone number contains a first portion corresponding to said first portion of said station canonical telephone number, said expansion analyzer expanding said non-canonical telephone number by adding said first portion of said station canonical telephone number to said non-canonical telephone number if said non-canonical telephone number does not contain said first portion, whereby said expanded non-canonical telephone number will contain said first portion corresponding to said first portion of said station canonical telephone number.

41. The system of claim 40 wherein said expansion analyzer further analyzes said non-canonical telephone number to determine if said non-canonical telephone number contains a second portion corresponding to said second portion of said station canonical telephone number, said expansion analyzer further expanding said non-canonical telephone number by adding said second portion of said station canonical telephone number to said non-canonical telephone number if said non-canonical telephone number does not contain said second portion, whereby said further expanded non-canonical telephone number will contain said first and second portions corresponding to said first and second portions of said station canonical telephone number.

42. A method for telephonic communication from a first location coupled to a telephone exchange, the method comprising the steps of:

(a) storing a station canonical telephone number for the first location, said station canonical telephone number having at least first and second portions;

(b) storing at least a first non-canonical telephone number for a location other than the first location in a phone book storage area;

(c) sensing user input to select one of said stored non-canonical telephone numbers from said phone book storage area;

(d) determining if said selected non-canonical telephone number contains a first portion corresponding to said first portion of said station canonical telephone number; and (e) expanding said selected non-canonical telephone number by adding said first portion of said station canonical telephone number to said selected non-canonical telephone number if said selected non-canonical telephone number is determined not to contain said first portion of said selected non-canonical telephone number, whereby said expanded non-canonical telephone number will contain said first portion corresponding to said first portion of said station canonical telephone number.

43. The method of claim 42, further including the steps of:

(f) further analyzing said selected non-canonical telephone number to determine if said selected non-canonical telephone number contains a second portion corresponding to said second portion of said station canonical telephone number; and (g) further expanding said selected non-canonical telephone number by adding said second portion of said station canonical telephone number to said selected non-canonical telephone number if said selected non-canonical telephone number does not contain said second portion, whereby said further expanded non-canonical telephone number will contain said first and second portions corresponding to said first and second portions of said station canonical telephone number.

44. The method of claim 42 wherein said first portion of said station canonical telephone number comprises one of a country code and a long distance code.

45. The method of claim 42 wherein said phone book storage area contains an interchange carrier telephone number for a designated long distance carrier, the method further including the step of adding said interchange carrier telephone number to said expanded non-canonical telephone number to permit telephonic communication to said expanded non-canonical telephone number using said designated long distance carrier.

46. The method of claim 42, further including the steps of:

comparing said first portion of said station canonical telephone number to said corresponding first portion of said expanded non-canonical telephone number; and deleting said first portion of said expanded non-canonical telephone number if said first portion of said station canonical telephone number matches said corresponding first portion of said expanded non-canonical telephone number to generate a callee telephone number.

47. The method of claim 46 for use in a telephone storing at least a first telephone prefix, the method further including the step of adding the first telephone prefix to said callee telephone number if said first portion of said expanded non-canonical telephone number is not deleted.

48. The method of claim 46, further including the steps of:

manually entering a corrected callee telephone number if said first portion of said expanded non-canonical telephone number was deleted; and restoring said first portion of said expanded non-canonical telephone number to generate said callee telephone number.

49. The method of claim 48, further including the step of using said connected callee telephone number in subsequent telephone calls from the first location to said non-canonical telephone number.

50. The method of claim 42, further including the step of generating dialing signals on the telephone exchange to initiate telephonic communication to said expanded non-canonical telephone number.

51. The method of claim 42, further including the step of generating audio tones corresponding to said expanded non-canonical telephone number dialer to acoustically couple dialing signals to the telephone exchange.

52. The method of claim 42, further including the step of manually entering said callee telephone number into said phone book storage area.

53. A method for telephonic communication from a first location coupled to a telephone exchange, the method comprising the steps of:

(a) storing a station canonical telephone number for the first location, said station canonical telephone number having at least first and second portions;

(b) entering a non-canonical telephone number for a location other than the first location;

(c) analyzing said non-canonical telephone number to determine if said non-canonical telephone number contains a first portion corresponding to said first portion of said station canonical telephone number; and (d) expanding said non-canonical telephone number by adding said first portion of said station canonical telephone number to said non-canonical telephone number if said non-canonical telephone number is determined not to contain said first portion of said non-canonical telephone number, whereby said expanded non-canonical telephone number will contain a first portion of said non-canonical telephone number corresponding to said first portion of said station canonical telephone number.

54. The method of claim 53, further including the steps of:

(e) further analyzing said non-canonical telephone number to determine if said non-canonical telephone number contains a second portion corresponding to said second portion of said station canonical telephone number; and (f) further expanding said non-canonical telephone number by adding said second portion of said station canonical telephone number to said non-canonical telephone number if said non-canonical telephone number is determined not to contain said second portion of said non-canonical telephone number, whereby said further expanded non-canonical telephone number will contain first and second portions corresponding to said first and second portions of said station canonical telephone number.

55. The method of claim 54 wherein said first portion of said station canonical telephone number comprises one of a country code and a long distance code.

56. The method of claim 53, further including the step of generating dialing signals on the telephone exchange to initiate telephonic communication to said expanded non-canonical telephone number.

57. The method of claim 53, further including the step of generating audio tones corresponding to said expanded non-canonical telephone number dialer to acoustically couple dialing signals to the telephone exchange.

58. The method of claim 53, further including the steps of:

altering said station canonical telephone number; and storing said altered station canonical telephone number in said station information storage area, said step (c) of analyzing uses said altered station canonical telephone number to analyze said non-canonical telephone number instead of said station canonical telephone number.

59. The method of claim 53 wherein said step (b) of entering a non-canonical telephone number includes the entry of said non-canonical telephone number on a keypad by a user.

60. The method of claim 53 wherein said step (b) of entering a non-canonical telephone number includes the entry of said non-canonical telephone number on a touch sensitive display by a user.

61. The method of claim 53 wherein the first location contains a phone book storage area storing a plurality of non-canonical telephone numbers for locations other than the first location, the method further including the step of selecting one of said plurality of stored non-canonical telephone numbers from said phone book storage area for use as said non-canonical telephone number.

62. The method of claim 53, further including the step of using a dialer to generate dialing signals on the telephone exchange to initiate telephonic communication to said expanded non-canonical telephone number.

63. The method of claim 62 wherein said dialer includes a speaker, the method further including the steps of generating acoustic tones corresponding to said dialing signals, and transmitting said acoustic tones to the telephone exchange.

64. A method for telephonic communication from a first location coupled to a telephone exchange, the first location containing a station information storage area storing a station canonical telephone number for the first location, said station canonical telephone number having at least first and second portions, and a role storage area containing telephone numbering rules for a plurality of countries, the method comprising the steps of:

(a) entering a non-canonical telephone number for a location other than the first location;

(b) analyzing said non-canonical telephone number to determine if said non-canonical telephone number contains a first portion corresponding to a particular one of said plurality of countries, (c) expanding said non-canonical telephone number using telephone numbering rules for said particular country if said first portion corresponds to said particular country; and (d) expanding said non-canonical telephone number by adding said first portion of said station canonical telephone number to said non-canonical telephone number if said first portion of said non-canonical telephone number does not correspond to any of said plurality of countries.

\* \* \* \* \*